United States Patent
Kumar et al.

(10) Patent No.: US 8,750,856 B2
(45) Date of Patent: Jun. 10, 2014

(54) DISTRIBUTED SLEEPING CELL DETECTION

(75) Inventors: Gopal N. Kumar, Bridgewater, NJ (US); Kamakshi Sridhar, Plano, TX (US)

(73) Assignee: Alcatel Lucent, Paris (FR)

( * ) Notice: Subject to any disclaimer, the term of this patent is extended or adjusted under 35 U.S.C. 154(b) by 1083 days.

(21) Appl. No.: 12/714,831

(22) Filed: Mar. 1, 2010

(65) Prior Publication Data

US 2011/0037601 A1 Feb. 17, 2011

Related U.S. Application Data

(60) Provisional application No. 61/274,177, filed on Aug. 13, 2009.

(51) Int. Cl.
*G08B 21/00* (2006.01)
(52) U.S. Cl.
USPC ......... 455/422.1; 340/635; 455/418; 455/423
(58) Field of Classification Search
USPC .................... 455/418–420, 422.1–425, 550.1
See application file for complete search history.

(56) References Cited

U.S. PATENT DOCUMENTS

| | | | |
|---|---|---|---|
| 2006/0063521 A1* | 3/2006 | Cheung et al. | 455/423 |
| 2006/0128371 A1* | 6/2006 | Dillon et al. | 455/423 |
| 2010/0234006 A1* | 9/2010 | Vadlamudi | 455/418 |

FOREIGN PATENT DOCUMENTS

| | | |
|---|---|---|
| GB | 2 280 570 A | 2/1995 |
| WO | WO 2009/031959 | 3/2009 |

OTHER PUBLICATIONS

International Search Report PCT/US2010/43811 dated Aug. 13, 2009.
Written Opinion dated Aug. 13, 2009.
Schmelz et al, "FP7 ICT-Socrates. Algorithms for Self-Configuration and Self-Healing", Workshop FP7 ICT-Socrates, [online] Jun. 9, 2009, pp. 1-20, XP007915665.
Cheung B. et al. "Statistical Algorithms in Fault Detection and Prediction: Toward a Healthier Network", Bells Labs Technical Journal, Wiley, CA, US, vol. 9, No. 4, Feb. 1, 2005, pp. 172-185 XP001506909.

* cited by examiner

*Primary Examiner* — Kashif Siddiqui
(74) *Attorney, Agent, or Firm* — Davidson Sheehan LLP (57) ABSTRACT

The present invention provides a method that includes receiving, at a server, one or more alarms from a first cell in a plurality of cells. The alarm(s) indicate that the first cell has detected a candidate sleeping cell in the plurality of cells based on an activity and/or a load on a communication link between the first cell and the candidate sleeping cell. The method also includes determining, at the server, whether the candidate sleeping cell is a sleeping cell using the alarm.

19 Claims, 5 Drawing Sheets

DISTRIBUTED SLEEPING CELL DETECTION

This application claims the benefit of the filing date of U.S. Provisional Application Ser. No. 61/274,177, filed Aug. 13, 2009, entitled "DISTRIBUTED SLEEPING CELL DETECTION".

BACKGROUND OF THE INVENTION

1. Field of the Invention

This invention relates generally to communication systems, and, more particularly, to wireless communication systems.

2. Description of the Related Art

Wireless communication systems typically include a plurality of base stations or access points that provide wireless connectivity to mobile units within a geographical area. The device that provides the wireless connectivity and the geographic area are both conventionally referred to as a cell. The air interface between the base station or access point and the mobile unit supports one or more downlink (or forward link) channels from the base station to the mobile unit and one or more uplink (or reverse link) channels from the mobile units to the base station. The uplink and/or downlink channels include traffic channels, signaling channels, broadcast channels, paging channels, pilot channels, and the like. The channels can be defined according to various protocols including time division multiple access (TDMA), frequency division multiple access (FDMA), code division multiple access (CDMA), orthogonal frequency division multiple access (OFDMA), as well as combinations of these techniques. The geographical extent of each cell may be time variable and may be determined by the transmission powers used by the base stations, access point, and/or mobile units, as well as by environmental conditions, physical obstructions, and the like.

Conventional hierarchical wireless communication systems include a central element such as a Radio Network Controller (RNC) or a Base Station Controller (BSC). The central controller coordinates operation of the base stations and performs radio resource control functions such as call admission and resource allocation. For example, when data is available for a target mobile unit, the RNC may transmit paging messages to the target mobile unit via one or more base stations or node-Bs. The target mobile unit may establish a wireless link to one or more of the base stations in response to receiving the page from the wireless communication system. A radio resource management function within the RNC coordinates/allocates the resources used by the base stations and/or the target mobile unit for communication over the air interface. The radio resource management function can also perform fine grain control to allocate and release resources for broadcast transmission over a set of base stations.

One alternative to the conventional hierarchical network architecture is a distributed architecture including a network of access points, such as base station routers or eNodeBs (eNBs), which implement distributed communication network functionality. For example, each base station router or eNB may combine RNC/BSC and/or packet data serving node (PDSN) functions in a single entity that manages radio links between one or more mobile units and an outside network, such as the Internet. Base station routers and eNBs wholly encapsulate the cellular access technology and may proxy functionality that utilizes core network element support to provide equivalent IP functions. For example, IP anchoring in a UMTS base station router may be offered through a Mobile IP Home Agent (HA) and the GGSN anchoring functions that the base station router proxies through equivalent Mobile IP signaling. Compared to hierarchical networks that use centralized control, distributed architectures have the potential to reduce the cost and/or complexity of deploying the network, as well as the cost and/or complexity of adding additional wireless access points, e.g. base station routers and/or eNBs, to expand the coverage of an existing network. Distributed networks may also reduce (relative to hierarchical networks) the delays experienced by users because packet queuing delays at the separate RNC and PDSN entities in hierarchical networks may be reduced or removed.

In normal operation, base stations (or base station routers) serving each cell radiate a signal such as a pilot signal and mobile units in the corresponding cell can detect the presence of the base station by detecting the pilot signal. Mobile units can access the wireless communication system by establishing communication links over the air interface with cells that have a sufficiently strong pilot signals. If the mobile unit and the cell establish the connection, the cell becomes the termination point for the wireless communication link and the mobile unit can register with the cell to begin transmitting and/or receiving traffic over the air interface. Consequently, the number of attempted accesses, the number of terminations, the number of registrations, and the amount of traffic supported by a normally operating cell is roughly proportional to the number of mobile units that are located in each cell. However, cells do not always operate as expected.

One example of a cell that is not operating correctly is a "sleeping cell." A sleeping cell may be visible to mobile units in the cell because it is radiating the expected pilot signal but the sleeping cell may not be receiving the expected number of access requests, terminations, registrations, and/or traffic. In another case, the sleeping cell may not even be radiating and so may be invisible to mobile units in the cell. Since mobile units cannot see the sleeping cell, this cell may also be receiving a smaller than expected number of access requests, terminations, registrations, and/or traffic. Sleeping cells may result from hardware, firmware, and/or software problems in the base station. Regardless of the source of the problem, conventional base stations and access points do not include alarms to report sleeping cell behavior to the system. The network therefore interprets the sleeping cell as a coverage area hole, which can degrade coverage and/or capacity of the wireless communication system. User experience can also be degraded.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided that includes receiving, at a server, one or more alarms from a first cell in a plurality of cells. The alarm(s) indicate that the first cell has detected a candidate sleeping cell in the plurality of cells based on an activity and/or a load on a communication link between the first cell and the candidate sleeping cell. The method also includes determining, at the server, whether the candidate sleeping cell is a sleeping cell based on the alarm.

In another embodiment, a method is provided that includes transmitting, from a first cell to a server, an alarm indicating that the first cell has detected a candidate sleeping cell based on an activity and/or a load on a communication link between the first cell and the candidate sleeping cell. The method also includes receiving, at the first cell and from the server, signaling indicating whether the server has determined that the candidate sleeping cell is a sleeping cell based on the alarm.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
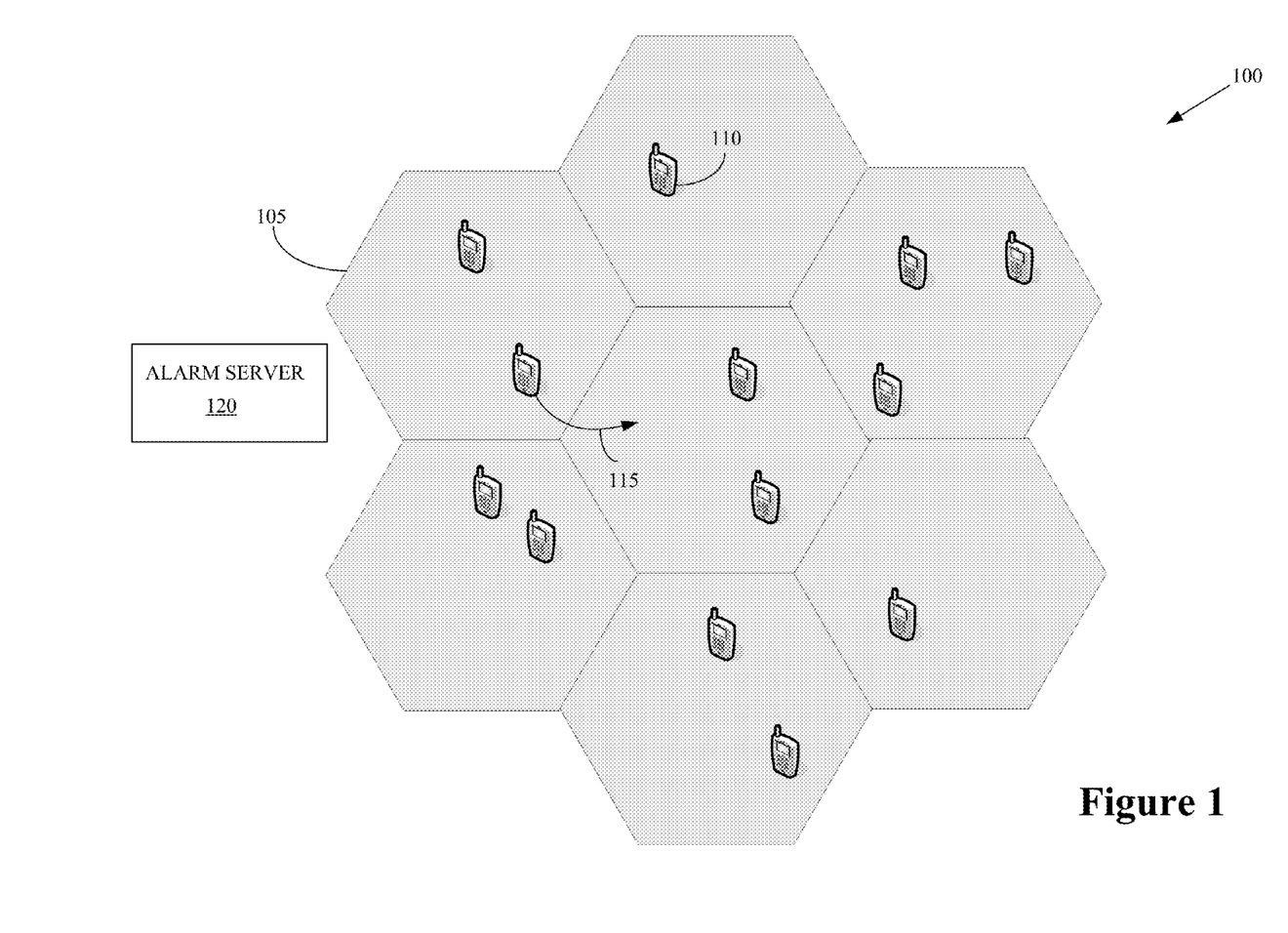
FIG. 1 conceptually illustrates a first exemplary embodiment of a wireless communication system.

FIG. 1 conceptually illustrates a first exemplary embodiment of a wireless communication system 100. In the illustrated embodiment, the wireless communication system 100 provides wireless connectivity over an air interface to a plurality of coverage areas or cells 105 (only one indicated by a distinguishing numeral). In the interest of clarity, the cells 105 are depicted in FIG. 1 as regular hexagons with clearly defined edges. However, persons of ordinary skill in the art having benefit of the present disclosure should appreciate that actual cells may have irregular and/or time varying shapes. Moreover, the boundaries between the cells may not be clearly defined and different cells may provide coverage in overlapping areas. In some embodiments, each cell 105 may also be divided into one or more sectors that are served by one or more antennas or groups of antennas. As used herein, the term "cell" may refer to the entire cell or to a sector of a cell depending on the context in which this term is used.

The first exemplary embodiment of the wireless communication system 100 is a distributed communication system that uses a network of base station routers or eNobeBs (not shown in FIG. 1) to provide wireless connectivity to mobile units 110 (only one indicated by a distinguishing numeral) within the cells 105. The base station routers may combine RNC/BSC and/or packet data serving node (PDSN) functions in a single entity that manages radio links and/or resources for communication between one or more mobile units and an outside network, such as the Internet. Base station routers and eNBs wholly encapsulate the cellular access technology and may proxy functionality that utilizes core network element support to equivalent IP functions. The base station routers that serve the cells 105 are therefore interconnected over interfaces such as the X2 interface defined by the Long Term Evolution (LTE) of 3GPP standards and/or protocols. These interfaces are used to support inter-cellular communication and signaling, such as the signaling used to support mobility of the mobile units 110.

Each cell 105 experiences an inter-cellular load or activity level associated with communication between the cells 105 and an intra-cellular load or activity level associated with communication between the cell 105 and mobile units 110 within the corresponding cell 105. The inter-cellular activity and the intra-cellular activity can be used as measures of the air interface activity on neighboring cells and may be correlated during normal operation. For example, during normal operation some mobile units 110 remain within a particular cell 105 and other mobile units 110 roam and are therefore handed off between different cells 105 (as indicated by the arrows 115). Each hand off requires inter-cellular signaling (e.g., radio resource control signaling) between the cells 105 involved in the hand off. Before, during, and/or after the hand off, the mobile unit 110 may be in communication with one or more of the cells 105 depending on whether the hand off is a hard hand off, a soft handoff, or a softer hand off. The number of handoffs between cells 105 is typically larger when there are more mobile units 110 within the cells 105. The intra-cellular activity associated with wireless communication between each cell 105 and mobile units 110 within that cell 105 is also typically larger when there are more mobile units 110 within the cells 105. Consequently, the inter-cellular activity and the intra-cellular activity are typically correlated.

The inter-cellular activity and the intra-cellular activity within the wireless communication system 100 can be used to implement a distributed technique for detecting sleeping cells. For example, in an LTE system, the cells 105 are served by interconnected eNodeBs that provide wireless connectivity and support mobility and radio resource allocation within the system 100. Neighboring eNodeBs are interconnected using X2 connections that are used to carry signaling for X2 handovers, inter-cellular interference cancellation (ICIC) coordination, and the like. As discussed herein, the level of X2 activity towards and away from a cell 105 is indicative of the traffic and activity on the cell 105. Neighboring cells 105 can monitor the X2 activity towards all their neighbors to estimate the activity and the load carried by the neighbor cells 105. Each 105 cell has a very good understanding of its own traffic load, e.g. the load generated to support wireless communication with mobile units 110 over the air interface. If a cell 105 determines that the X2 activity towards a particular neighbor cell 105 is disproportionately low compared to its own traffic load, then the cell 105 can compute the probability of a fault in the neighboring cell 105. If this probability is above a tolerable threshold, the cell 105 may send an alarm to an alarm server 120 in the wireless system 100. If the alarm server 120 receives alarms from a significant number of neighbors, then the neighbor cell 105 can be declared a sleeping cell.

Figure 2A:
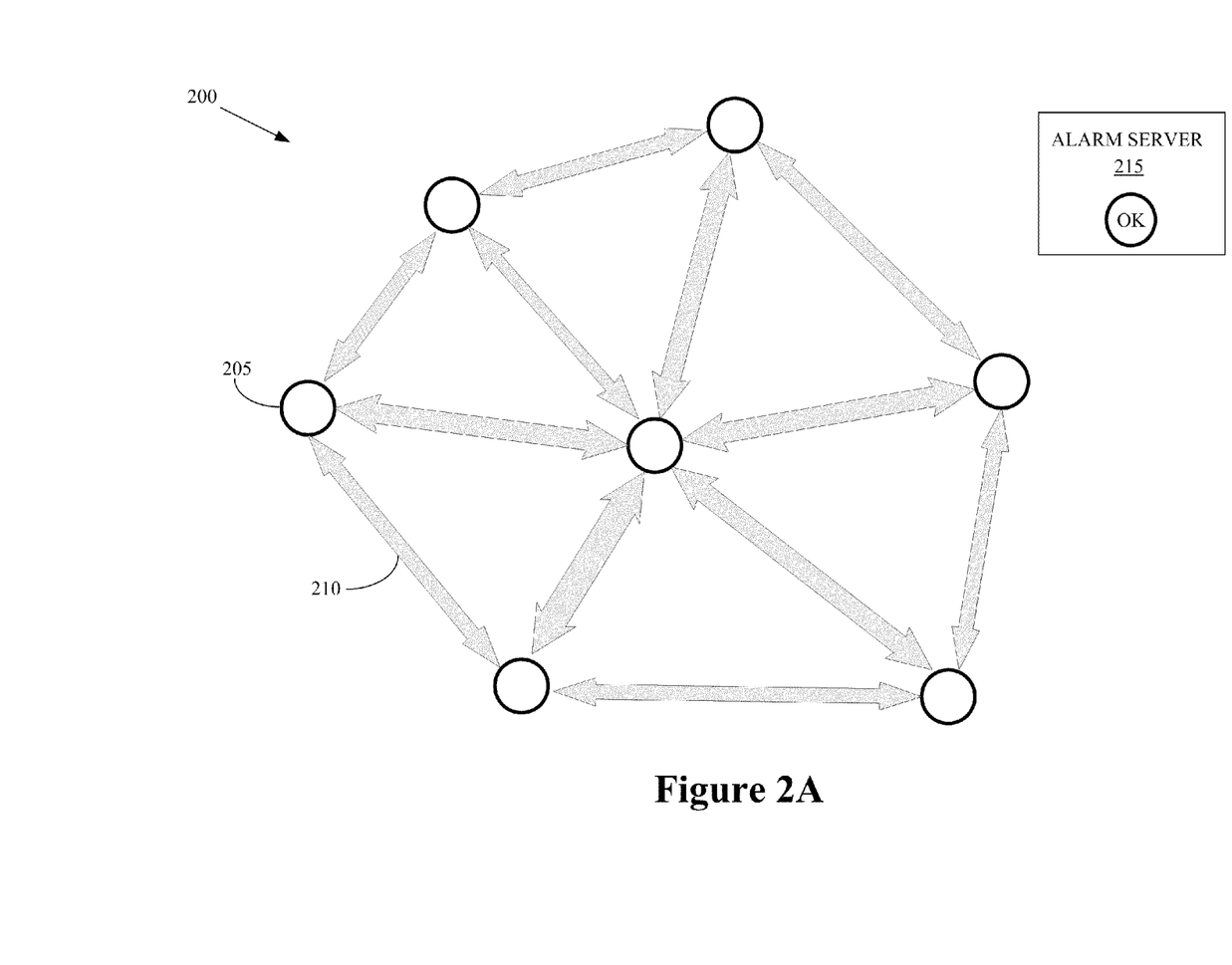
FIGS. 2A, 2B, and 2C conceptually illustrate a second exemplary embodiment of a wireless communication system during first, second, and third time intervals, respectively.

FIG. 2A conceptually illustrates a second exemplary embodiment of a wireless communication system 200 during a first time interval. In the second exemplary embodiment, distributed access points 205 (only one indicated by a distinguishing numeral in FIG. 2) are interconnected by interfaces 210 (only one indicated by a distinguishing numeral in FIG. 2). The distributed access points 205 may be base station routers and/or eNodeBs depending on the particular standards and/or protocols that are implemented by the wireless communication system 200. The traffic load and/or activity carried by the interfaces 210 as indicated by the relative successes of the double-headed arrows used to represent the interfaces 210. The second exemplary embodiment of the wireless communication system 200 also includes an alarm server 215 that is able to communicate with the distributed access points 205. Although the interconnections between the alarm server 215 and the distributed access points 205 are not explicitly shown in FIG. 2, persons of ordinary skill in the art having benefit of the present disclosure should be able to configure the wireless communication system 200 to enable communication between the alarm server 215 and the distributed access points 205 using conventional wired and/or wireless networking.

The distributed access points 205 are working normally during the first time interval. The interfaces 210 are therefore carrying traffic between the distributed access points 205, such as X2 traffic that is used to carry signaling for X2 handovers, inter-cellular interference cancellation (ICIC) coordination, and the like. The different interfaces 210 are carrying different amounts of traffic and the level of traffic activity and/or the load on the different interfaces 210 correlates with the level of intra-cellular traffic activity and/or load on each distribute access point 205. In one embodiment, the distributed access points 205 can determine an expected correlation between the inter-cellular activity/load and the intra-cellular activity/load. This correlation can then be used to determine a probability that a neighboring distributed access point 205 is operating normally.

Figure 3A:
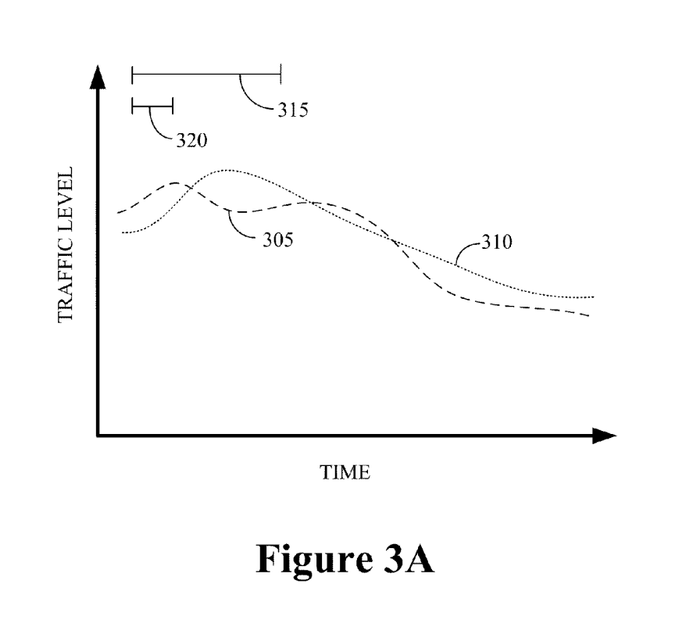
FIGS. 3A and 3B conceptually illustrate the activity and/or load on exemplary cells.

FIG. 3A conceptually illustrates the activity and/or load on one exemplary cell. In the illustrated embodiment, the traffic level as indicated on the vertical axis and increasing time is indicated on the horizontal axis. The units of these axes are arbitrary. Dashed line 300 indicates inter-cellular activity on an interface between a cell and a neighboring cell and the dotted line 305 indicates intra-cellular activity on the cell, e.g. the activity and/or load generated by supporting wireless connections over an air interface. Exemplary measures of the inter-cellular activity and/or load include radio resource control (RRC) connection requests, handoff requests, and the like. Exemplary measures of the intra-cellular activity and/or load include access requests paging requests, measures of allocated resources, and the like. Although activity for a single neighbor cell is showing FIG. 3A, in alternative embodiments, each cell may have a number of neighbor cells having activity levels that may be correlated with the activity level of the cell.

The inter-cellular activity 300 and the intra-cellular activity 305 are correlated and so measurements of these quantities can be used to estimate correlations on various timescales. For example, a relatively large time window 310 can be used to estimate correlations over relatively longer time intervals. These correlations can be used to detect general trends in the correlation, such as variations in the correlation over different days of the week. For another example, a relatively small time window 315 can be used to estimate correlations over relatively shorter time intervals. These correlations can be used to detect shorter-term variations in the correlation, such as variations in the correlation from hour-to-hour. The value of the correlation coefficient can be computed periodically over a selected time interval, substantially continuously using a sliding time window, and/or in response to a request from an entity within the wireless communication system.

Referring back to FIG. 2A, the correlations determined for the distributed access points 205 can be used to estimate probabilities that neighboring access points 205 are operating correctly. For example, each access point 205 may be able to determine a probability that a neighboring access point 205 is operating correctly for particular measured values of the inter-cellular activity/load and the intra-cellular activity/load. This probability can be defined as $P(Vn|Vs,c)$, where Vn is the inter-cellular traffic load or activity between the cell and the neighbor cell, Vs is the intra-cellular traffic load and/or activity supported by the cell, and c is the measured correlation coefficient that indicates an expected level of correlation between Vn and Vs during normal operation of the cells. Different values of the probabilities can be defined for different timescales, e.g., using correlation coefficients determined on different timescales.

The distributed access points 205 may also estimate a threshold value (T) for the probability that indicates that the neighbor cell may be a sleeping cell. For example, the distributed access points 205 may identify a neighbor cell as a candidate sleeping cell when the condition $P(Vn|Vs,c)<T$ is satisfied for a selected period of time. The value of the threshold can be predetermined and set at a fixed level. Alternatively, the value of the threshold (and optionally the selected time interval) can be computed as a function of the correlation coefficient. For example, if the correlation between the inter-cellular activity and the intra-cellular activity is very strong (e.g., the computed value of the correlation coefficient is near 1), then the value of the threshold can be set relatively low and (optionally) the selected time period maybe set to a relatively short time period. For another example, if the correlation between the inter-cellular activity and the intra-cellular activity is relatively weak (e.g., the computed value of the correlation coefficient is closer to 0), then the value of the threshold can be set relatively high and (optionally) the selected time period maybe set to a relatively long time period. Different values of the threshold and (optionally) the time that the probability must be below the threshold can be determined for different values of the time interval used to determine the correlation coefficient.

The wireless communication system 200 also includes an alarm server 215 that is used to determine whether one or more of the distributed access points 205 are sleeping cells. The alarm server 215 uses alarms transmitted by individual cells 205 to make this determination. The distributed access points 205 are operating normally during the time interval depicted in FIG. 2A and the interfaces 210 are carrying the expected amount of traffic. No alarms have been transmitted. The alarm server 215 therefore indicates that conditions are currently OK and the distributed access points 205 and the wireless communication system 200 are operating normally.

Figure 2B:
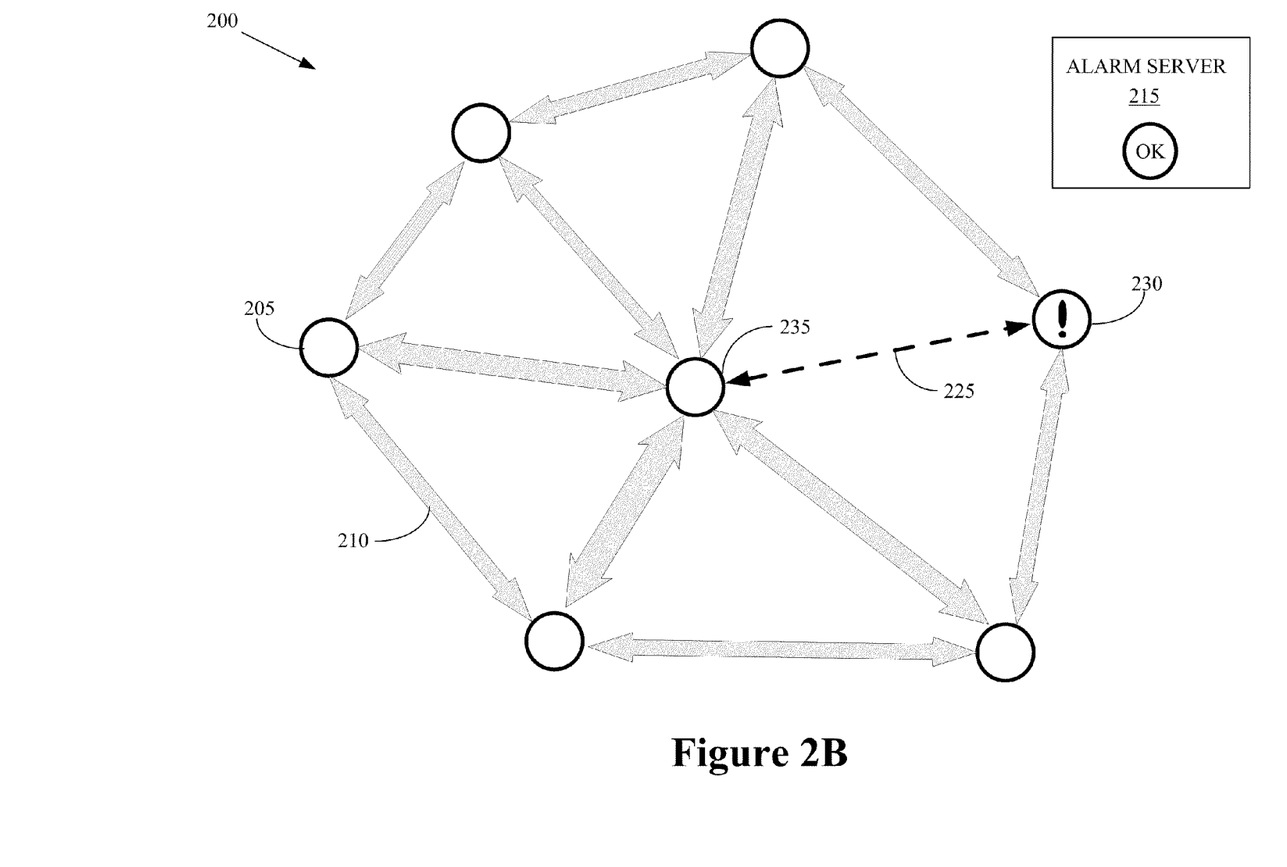

FIG. 2B conceptually illustrates the second exemplary embodiment of the wireless communication system 200 during a second time interval. During the second time interval, most of the interfaces 210 are carrying the expected amount of traffic. However, the interface 225 between the cell 230 and the cell 235 is not carrying the amount of traffic expected based upon previous measurements or other techniques for establishing the expected level of traffic. For example, the distributed access point 230 may identify the neighbor cell 235 as a candidate sleeping cell when the condition $P(Vn|Vs, c) < T$ is satisfied for a selected period of time. The cell 230 may therefore transmit an alarm to the alarm server 215. The alarm may be in the form of a message or other signal.

Figure 3B:
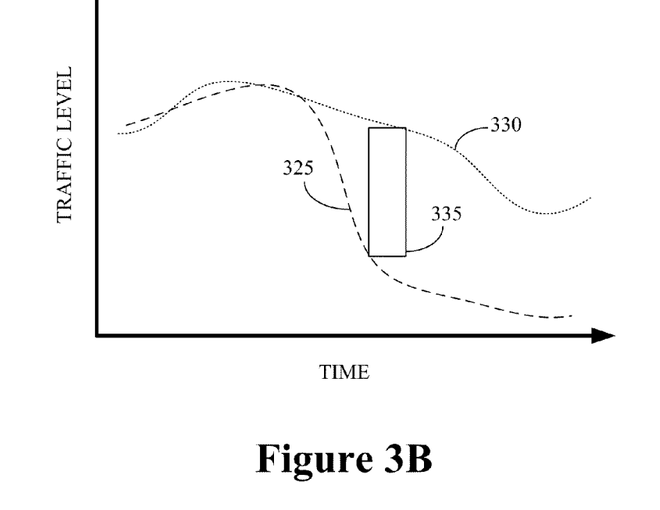

FIG. 3B conceptually illustrates the activity and/or load on one exemplary cell. In the illustrated embodiment, the traffic level is indicated on the vertical axis and increasing time is indicated on the horizontal axis. The units of these axes are arbitrary. Dashed line 325 indicates inter-cellular activity on an interface between a cell and a neighboring cell and the dotted line 330 indicates intra-cellular activity on the cell, e.g. the activity and/or load generated by supporting wireless connections over an air interface. Initially, the inter-cellular activity 325 and the intra-cellular activity 330 follow the expected correlation. However, during the time interval indicated by the box 335, the intra-cellular activity remains at a relatively high level while the inter-cellular activity 325 drops significantly. This drop indicates that the interface between the two cells is not carrying the expected amount of traffic. For example, the condition $P(Vn|Vs,c) < T$ may be satisfied over the selected period of time 335 and an alarm may be sent to an alarm server.

Referring back to FIG. 2B, the alarm server 215 uses the alarms transmitted by the cell 230 to determine whether the neighbor cell 235 is a sleeping cell. In the illustrated embodiment, other cells 205 that neighbor the cell 235 are receiving substantially normal inter-cellular traffic from the cell 235, as determined by a comparison with their own intra-cellular traffic. These cells therefore do not transmit alarms to the alarm server 215 during the second time interval. The variations in the traffic over the interface 225 may not necessarily be caused by a sleeping cell 235. For example, the traffic between the cells 230, 235 over the interface 225 may vary because of conditions such as a broken connection, changes in environmental conditions, a temporary loss of synchronization, a random normal fluctuation in the traffic, and the like. These conditions may occur even when the cell 235 is not a sleeping cell. In the illustrated embodiment, the alarm server 215 determines that the cell 235 is not sleeping and the system is OK, at least in part because only the cell 230 is providing an alarm condition.

Figure 2C:
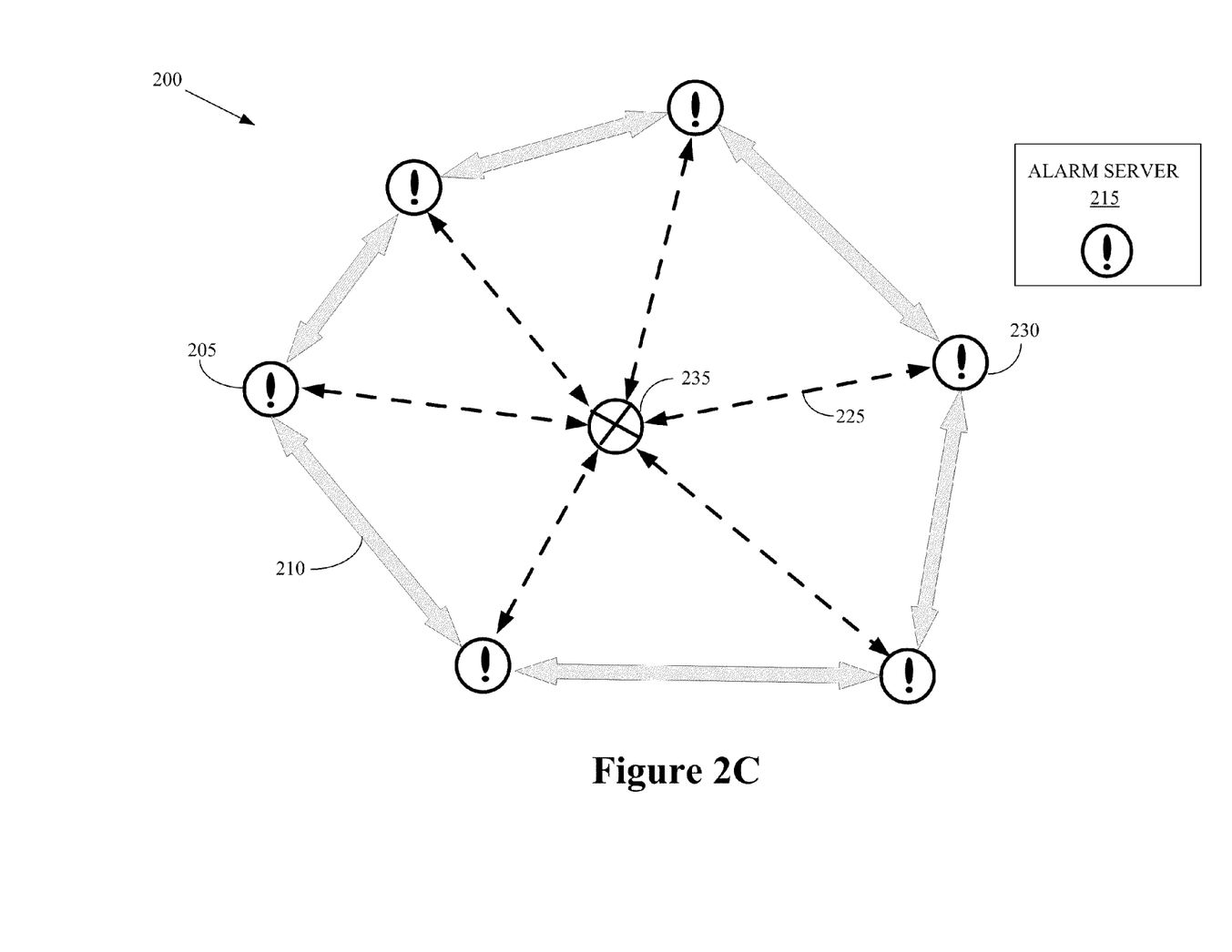

FIG. 2C conceptually illustrates the second exemplary embodiment of the wireless communication system 200 during a third time interval. During the third time interval, the cells 205, 230 determine that the interfaces 210, 225 are not carrying the expected amount of traffic (as indicated by the dashed double-headed arrows). For example, the distributed access points 205, 230 may each identify the neighbor cell 235 as a candidate sleeping cell when the condition $P(Vn|Vs, c) < T$ is satisfied for a selected period of time. The cells 205, 230 may therefore each transmit an alarm to the alarm server 215. The alarm may be in the form of a message or other signal. In one embodiment, the alarms may be received concurrently. Alternatively, the alarm server 215 may consider alarms that are received within a selected time interval or alarms that have been received until other signals are received indicating that the alarm condition is over and traffic has returned to normal levels.

The alarm server 215 determines that there is a very high probability that the cell 235 is a sleeping cell because of the large number of alarms. The alarm server 215 therefore declares cell 235 to be a sleeping cell. For example, the alarm server 215 may declare the cell 235 to be a sleeping cell based on the high probability and in response to determining that the network has not provided any information indicating any other faults that the cell 235. Persons of ordinary skill in the art having benefit of the present disclosure should appreciate that it is not necessary for all of the cells 205, 230 to transmit an alarm for the alarm server 215 to declare cell 235 to be a sleeping cell. In alternative embodiments, the alarm server 215 can use thresholds and/or statistical measures to determine whether the cell 235 is a sleeping cell when alarms are received from less than all of the distributed access points 205, 230.

When the alarm server 215 declares the cell 235 to be a sleeping cell, messages or other signaling may be transmitted to the neighbor cells 205, 230 to tell them that cell 235 is a sleeping cell. The neighbor cells 205, 230 may then take action in response to this message. For example, the neighbor cells 205, 230 may increase transmission powers (such as pilot signal strengths) to provide coverage to the area that was expected to be covered by the cell 235. Other coordinated operations of the cells 205, 230 may also be taken in response to receiving the message indicating that the cell 235 is a sleeping cell. Consequently, the distributed sleeping cell detection technique described in the present application may advantageously allow the wireless communication system 200 to adapt to and/or compensate for unexpected failures that lead to sleeping cells.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    receiving, at a server, at least one alarm from at least one first cell in a plurality of cells, said at least one alarm indicating that said at least one first cell has detected a candidate sleeping cell in the plurality of cells based on at least one of an activity and a loading of at least one communication link between said at least one first cell and the candidate sleeping cell, wherein the alarm is received in response to said at least one first cell determining that said at least one of the activity and the loading on the communication link is below a threshold value corresponding to a probability that the candidate sleeping cell is a sleeping cell; and
    determining, at the server, whether the candidate sleeping cell is a sleeping cell using said at least one alarm.

2. The method of claim 1, wherein receiving said at least one alarm from said at least one first cell comprises receiving said at least one alarm in response to said at least one first cell determining that said at least one of the activity and the loading on the communication link between said at least one first cell and the candidate sleeping cell is below a threshold value.

3. The method of claim 2, wherein the threshold value of the probability that the candidate sleeping cell is a sleeping cell is determined based on a correlation between intra-cellular activity at said at least one first cell and an inter-cellular activity or load on said at least one first cell.

4. The method of claim 1, wherein receiving said at least one alarm comprises receiving a plurality of alarms from a plurality of first cells.

5. The method of claim 4, wherein determining whether the candidate sleeping cell is a sleeping cell comprises determining that the candidate cell is a sleeping cell when the plurality of alarms exceeds a threshold number of alarms.

6. The method of claim 5, wherein determining whether the candidate sleeping cell is a sleeping cell comprises determining that the candidate cell is a sleeping cell when the server has not detected another fault condition associated with the candidate sleeping cell.

7. The method of claim 1, comprising providing, from the server to said at least one first cell, signaling indicating that the server has determined that the candidate sleeping cell is a sleeping cell.

8. A method, comprising:
    transmitting, from a first cell to a server, an alarm indicating that the first cell has detected a candidate sleeping cell based on at least one of an activity and a load on a communication link between the first cell and the candidate sleeping cell, wherein the alarm is transmitted in response to the first cell determining that said at least one of the activity and the load on the communication link is below a threshold value corresponding to a probability that the candidate sleeping cell is a sleeping cell; and
    receiving, at the first cell and from the server, signaling indicating whether the server has determined that the candidate sleeping cell is a sleeping cell using the alarm.

9. The method of claim 8, comprising estimating, at the first cell, air interface activity at the candidate sleeping cell based on said at least one of the activity and the load on the communication link between the first cell and the candidate sleeping cell, and comprising measuring air interface activity at the first cell.

10. The method of claim 9, comprising determining a correlation between estimated air interface activity at the candidate sleeping cell and measured air interface activity at the first cell.

11. The method of claim 10, wherein determining the correlation comprises determining the correlation for at least one selected time interval using previously measured values of the estimated air interface activity at the candidate sleeping cell and the measured air interface activity at the first cell.

12. The method of claim 11, comprising detecting the candidate sleeping cell when a probability that the candidate sleeping cell is a sleeping cell is below a selected threshold.

13. The method of claim 12, comprising determining the probability that the candidate sleeping cell is a sleeping cell as a function of the estimated air interface activity at the candidate sleeping cell, the measured air interface activity at the first cell, and the correlation for said at least one selected time interval.

14. The method of claim 8, wherein receiving the signaling indicating whether the server has determined that the candidate sleeping cell is a sleeping cell based on the alarm comprises receiving signaling indicating that the candidate sleeping cell is a sleeping cell in response to the server receiving the alarm from the first cell and at least one alarm from at least one second cell.

15. A method, comprising:
    receiving, at a server, at least one alarm from at least one first cell in a plurality of cells, said at least one alarm indicating that said at least one first cell has detected a candidate sleeping cell in the plurality of cells based on at least one of an activity and a loading of at least one communication link between said at least one first cell and the candidate sleeping cell; and
    determining, at the server, whether the candidate sleeping cell is a sleeping cell using said at least one alarm;
    wherein receiving said at least one alarm compromises:
        receiving said at least one alarm in response to said at least one first cell determining that the activity or the load on the communication link between said at least one first cell and the candidate sleeping cell is below a threshold value; and receiving said at least one alarm in response to said at least one first cell determining that the activity or the load on the communication link is below a threshold value corresponding to a probability that the candidate sleeping cell is a sleeping cell.

16. The method of claim 15, wherein the threshold value of the probability that the candidate sleeping cell is a sleeping cell is determined based on a correlation between intra-cellular activity at said at least one first cell and an inter-cellular activity or load on said at least one first cell.

17. The method of claim 15, wherein receiving said at least one alarm comprises receiving a plurality of alarms from a plurality of first cells.

18. The method of claim 17, wherein determining whether the candidate sleeping cell is a sleeping cell comprises determining that the candidate cell is a sleeping cell when the plurality of alarms exceeds a threshold number of alarms.

19. The method of claim 18, wherein determining whether the candidate sleeping cell is a sleeping cell comprises determining that the candidate cell is a sleeping cell when the server has not detected another fault condition associated with the candidate sleeping cell.

* * * * *